US010099652B2

(12) United States Patent
Uchibori et al.

(10) Patent No.: US 10,099,652 B2
(45) Date of Patent: Oct. 16, 2018

(54) ENERGY ABSORBING DEVICE, SEAT BELT RETRACTOR AND SEAT BELT DEVICE

(71) Applicant: JOYSON SAFETY SYSTEMS JAPAN K.K., Tokyo (JP)

(72) Inventors: Hayato Uchibori, Shiga (JP); Daichi Nemoto, Shiga (JP)

(73) Assignee: JOYSON SAFETY SYSTEMS JAPAN K.K., Tokyo (JP)

(*) Notice: Subject to any disclaimer, the term of this patent is extended or adjusted under 35 U.S.C. 154(b) by 0 days.

(21) Appl. No.: 15/534,986

(22) PCT Filed: Nov. 26, 2015

(86) PCT No.: PCT/JP2015/083163
§ 371 (c)(1),
(2) Date: Jun. 9, 2017

(87) PCT Pub. No.: WO2016/093065
PCT Pub. Date: Jun. 16, 2016

(65) Prior Publication Data
US 2017/0349138 A1 Dec. 7, 2017

(30) Foreign Application Priority Data
Dec. 12, 2014 (JP) ................................ 2014-252170

(51) Int. Cl.
*B60R 22/28* (2006.01)
*B60R 22/34* (2006.01)
(Continued)

(52) U.S. Cl.
CPC ............ *B60R 22/341* (2013.01); *B60R 22/28* (2013.01); *B60R 22/34* (2013.01); *B60R 22/36* (2013.01); *B60R 22/46* (2013.01)

(58) Field of Classification Search
CPC ... B60R 22/28; B60R 22/341; B60R 22/3413; B60R 22/34; B60R 2022/285; B60R 2022/288; B60R 2022/289
(Continued)

(56) References Cited

U.S. PATENT DOCUMENTS 6,497,379 B2 * 12/2002 Yano .................. B60R 22/3413
242/379.1
8,262,059 B2 9/2012 Dolenti et al.
(Continued)

FOREIGN PATENT DOCUMENTS

DE 10 2007 060 268 A1 6/2009
DE 10 2009 010 435 A1 9/2010
(Continued)

OTHER PUBLICATIONS

International Search Report issued in International Patent Application No. PCT/JP2015/083163 dated Jan. 26, 2016.

*Primary Examiner* — Keith J Frisby
(74) *Attorney, Agent, or Firm* — Foley & Lardner LLP (57) ABSTRACT

An energy absorbing device, a seat belt retractor, and a seat belt device, that can change an energy absorption characteristic continuously, and improve durability. A base plate that is connected to a spool and has a corrugated groove annularly formed, a cover plate that is opposingly connected to the base plate and has a corrugated groove synchronized with the corrugated groove of the base plate, a plurality of driving pins with a first end inserted into the corrugated groove of the base plate and a second end inserted into the corrugated groove of the cover plate, a plurality of mass bodies that are arranged in respective intermediate portions of the driving pins, and intermediate plates that are inserted with the driving pins, arranged on both sides of the mass bodies, and connected to a locking base.

6 Claims, 9 Drawing Sheets

(51) Int. Cl.
B60R 22/36 (2006.01)
B60R 22/46 (2006.01)

(58) Field of Classification Search
USPC ........................................ 280/805; 242/379.1
See application file for complete search history.

(56) References Cited

U.S. PATENT DOCUMENTS

| | | |
|---|---|---|
| 8,473,162 B2 | 6/2013 | Jabusch |
| 8,523,140 B2 | 9/2013 | Dolenti et al. |
| 8,529,398 B2 | 9/2013 | Jabusch |
| 9,242,617 B2 | 1/2016 | Singer et al. |
| 9,327,681 B2 | 5/2016 | Singer et al. |
| 9,487,184 B2 | 11/2016 | Jabusch |
| 2005/0133330 A1 | 6/2005 | Stiefvater |
| 2009/0222171 A1 | 9/2009 | Jabusch |
| 2009/0302246 A1 | 12/2009 | Dolenti et al. |
| 2011/0172054 A1 | 7/2011 | Jabusch |
| 2013/0001033 A1 | 1/2013 | Dolenti et al. |
| 2013/0140391 A1 | 6/2013 | Jabusch |
| 2013/0320127 A1 | 12/2013 | Singer et al. |
| 2015/0083841 A1 | 3/2015 | Singer et al. |
| 2015/0203070 A1 | 7/2015 | Singer et al. |
| 2016/0229375 A1 | 8/2016 | Jabusch et al. |

FOREIGN PATENT DOCUMENTS

| | | |
|---|---|---|
| DE | 10 2008 049 931 B4 | 3/2012 |
| DE | 10 2011 008 405 A1 | 7/2012 |
| DE | 10 2011 101 481 A1 | 11/2012 |
| DE | 10 2011 101 517 A1 | 11/2012 |
| DE | 10 2011 101 518 A1 | 11/2012 |
| DE | 10 2011 114 572 A1 | 4/2013 |
| DE | 10 2011 101 516 B4 | 7/2013 |
| DE | 10 2012 010 918 A1 | 12/2013 |
| DE | 10 2010 026 285 B4 | 2/2014 |
| DE | 10 2010 050 189 B4 | 3/2014 |
| DE | 10 2012 214 521 B4 | 3/2014 |
| DE | 10 2013 001 375 A1 | 7/2014 |
| DE | 10 2011 089 203 B4 | 8/2014 |
| DE | 10 2011 101 515 B4 | 8/2014 |
| DE | 10 2014 202 498 B3 | 3/2015 |
| DE | 10 2013 220 949 A1 | 4/2015 |
| DE | 10 2013 203 286 B4 | 12/2016 |
| EP | 1 874 593 B1 | 12/2010 |
| JP | 2013-184538 A | 9/2013 |
| JP | 2015-128925 A | 7/2015 |
| WO | WO 2004/096611 A1 | 11/2004 |
| WO | WO 2007/130041 A1 | 11/2007 |
| WO | WO 2010/139433 A1 | 12/2010 |
| WO | WO 2012/059166 A1 | 5/2012 |
| WO | WO 2012/156019 A1 | 11/2012 |
| WO | WO 2012/156020 A1 | 11/2012 |
| WO | WO 2013/079150 A1 | 6/2013 |
| WO | WO 2014/131824 A1 | 9/2014 |
| WO | WO 2015/121159 A1 | 8/2015 |

* cited by examiner

ENERGY ABSORBING DEVICE, SEAT BELT RETRACTOR AND SEAT BELT DEVICE

CROSS-REFERENCE TO RELATED APPLICATIONS

The present application is a U.S. national stage application of International Patent Application No. PCT/JP2015/083163, filed Nov. 26, 2015, which claims the benefit of priority to Japanese Patent Application No. 2014-252170, filed Dec. 12, 2014, the entireties of which are hereby incorporated by reference.

TECHNICAL FIELD

The present invention relates to an energy absorbing device, a seat belt retractor and a seat belt device, particularly, an energy absorbing device that is disposed between objects that are relatively rotated, a seat belt retractor that includes the energy absorbing device, and a seat belt device that includes the seat belt retractor.

BACKGROUND ART

For example, in a winding device (including a rewinding function) for a belt-like or string-like long-length material, a retracting drum (also referred to as a drum or a spool) that winds the long-length material is rotationally moved relative to a supporting unit that rotatably supports the retracting drum. In such a device that performs relative rotational movement, since a large load is applied to the device or the long-length material when the long-length material is fully extended or when the retracting drum is stopped while winding or rewinding, it is preferable that an energy absorbing device is disposed between objects that perform relative rotational movement. As an example of such a winding device, a seat belt retractor that is used for a seat belt device is representative (e.g., see Patent Literature 1 or 2).

Patent Literature 1 discloses a seat belt retractor, in which a torsion bar and a wire are disposed between a winding drum and a ratchet gear that are rotationally moved relative to each other. According to such a seat belt retractor, torsional deformation of the torsion bar and sliding deformation of the wire can absorb energy that may be generated between the winding drum and the ratchet gear, and by making a difference in a pull-out load required for the sliding deformation of the wire, an energy absorption characteristic can be changed.

Patent Literature 2 discloses a force limiter device for a vehicle, in which ring disks (1 and 3) and a swing member (2) are disposed between objects that perform relative rotational movement. According to such a device, when the swing member (2) is rotated relatively to the ring disks (1 and 3), a projection (5) formed to the swing member (2) comes into contact with projections (7 and 8) formed to the ring disks (1 and 3) while alternately swinging, which enables absorption of energy generated between the objects that perform relative rotational movement. In this device, particularly, while kinetic energy changes according to a rotational speed of the swing member (2), an increase in the rotational speed of the swing member (2) can increase the energy absorption amount.

CITATION LIST

Patent Literature

Patent Literature 1: JP 2013-184538 A
Patent Literature 2: WO 2012/059166 A

SUMMARY OF INVENTION

Technical Problem

For a seat belt device that has a seat belt retractor including an energy absorbing device as described in Patent Literature 1 or Patent Literature 2 described above, even in a same vehicle, occupants having various types of physique, such as males or females, people with large or small physique, or the like, sit on a seat. Therefore, even in a same seat belt device, a load applied to a webbing or a retractor in a vehicle collision varies.

To cope with this variable load, a vehicle must be disposed with a sensor that determines physique of an occupant, or disposed with an energy absorbing device capable of coping with different loads. It should be noted that, such a phenomenon is not limited to a seat belt retractor, and it may occur in a winding device, for example, that winds long-length materials (fabric, a sheet steel or the like) with different thicknesses and types.

However, while the energy absorbing device described in Patent Literature 1 can change the energy absorption characteristic in two stages of the wire and the torsion bar, it is not possible to change the energy absorption characteristic continuously.

Further, while the energy absorbing device described in Patent Literature 2 can change the energy absorption amount according to the rotational speed of the swing member, to cope with occupants with various types of physique, there is a problem that, since the swing member reciprocates between the ring disks, stress concentration may occur to make the swing member easily breakable when a load is unevenly generated on a whole circumference of the swing member. Additionally, since the swing member swings while rotating, the swing member may be deflected by a reaction force from the ring disks, easily accumulates metal fatigue, and is inferior in durability.

The present invention is made in view of the above-described problems, and an object of the present invention is to provide an energy absorbing device, a seat belt retractor, and a seat belt device, that can change the energy absorption characteristic continuously, and improve durability.

Solution to Problem

According to the present invention, there is provided an energy absorbing device that is disposed between objects that perform relative rotational movement, and the energy absorbing device includes a base plate that is connected to a first object and has a corrugated groove annularly formed, a cover plate that is opposingly connected to the base plate and has a corrugated groove synchronized with the corrugated groove of the base plate, a plurality of driving pins with a first end inserted into the corrugated groove of the base plate and a second end inserted into the corrugated groove of the cover plate, a plurality of mass bodies that are arranged in respective intermediate portions of the driving pins, and intermediate plates that are inserted with the driving pins, disposed on both sides of the mass bodies, and connected to a second object.

The mass bodies may be formed capable of reciprocating in a radial direction with respect to a rotational axis. Additionally, there may be included a guide that guides the movement of the mass bodies. The driving pins may be integrally formed with the mass bodies, maybe pressed into the mass bodies, or maybe inserted into the mass bodies in a loose fitting manner.

Additionally, according to the present invention, there is provided a seat belt retractor including a spool that winds a webbing that restrains an occupant, a shaft that is inserted into a shaft center of the spool, and a locking base that is connected to the shaft and capable of switching between a rotating state and a non-rotating state, characterized by including an energy absorbing device disposed between the spool and the locking base, wherein the energy absorbing device is an energy absorbing device according to the present invention described above.

Furthermore, according to the present invention, there is provided a seat belt device including a webbing that restrains an occupant, a seat belt retractor that winds the webbing, a belt anchor that fixes the webbing to a vehicle body side, a buckle disposed on a side surface of the seat, a tongue disposed to the webbing, wherein the seat belt retractor has an energy absorbing device according to the present invention described above.

Advantageous Effects of Invention

According to the energy absorbing device, the seat belt retractor, and the seat belt device of the present invention described above, by causing a relative rotational movement between the base plate and the intermediate plates, and between the cover plate and the intermediate plates around a common rotational axis, the driving pins with mass bodies can be moved along the corrugated groove, and an inertial force can act on the driving pins. Moreover, increase/decrease of an acceleration of the relative rotational movement increases and decreases an acceleration of the driving pins, which accordingly increases and decreases the inertial force. Therefore, between objects that perform relative rotational movement, the energy absorption amount can be varied according to the increase/decrease of the acceleration of the rotational movement, and the energy absorption characteristic can be changed continuously.

Furthermore, according to the present invention, energy generated between objects that perform relative rotational movement is converted to an inertial force, which is generated by movement of driving pins having mass bodies, to be absorbed, which eliminates an object moving in an axial direction, easily enhances a structural strength, and can improve durability of the energy absorbing device.

BRIEF DESCRIPTION OF THE DRAWINGS

FIGS. 3(A) to 3(C) are views illustrating the energy absorbing device shown in FIG. 1, in which

FIGS. 4(A) and 4(B) are views illustrating the energy absorbing device shown in FIG. 1, in which

FIGS. 5(A) to 5(D) are views illustrating an operation of the energy absorbing device, in which

FIGS. 6(A) and 6(B) are views illustrating modifications of the energy absorbing device shown in FIG. 1, in which

FIGS. 7(A) and 7(B) are conceptual views showing the seat belt retractor shown in FIG. 1, in which

FIGS. 8(A) and 8(B) are graphs showing an effect of the seat belt retractor according to the first embodiment of the present invention, in which

DESCRIPTION OF EMBODIMENT

Figure 1:
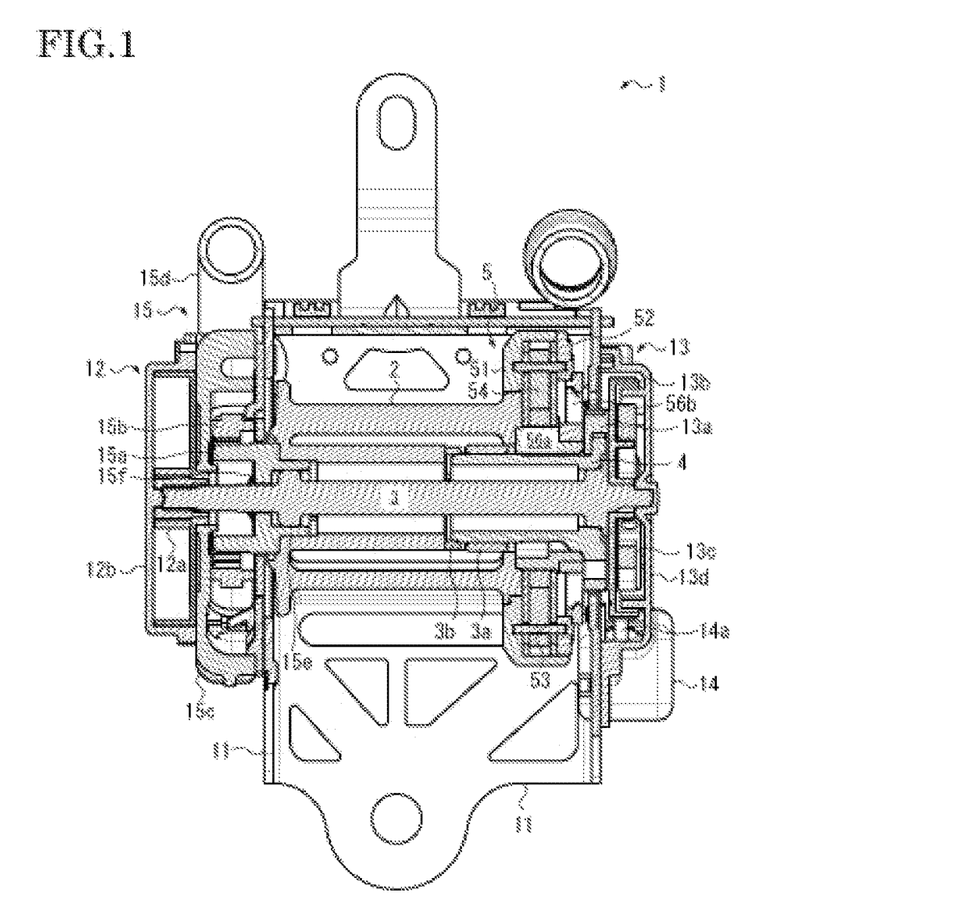
FIG. 1 is a cross-sectional view showing a seat belt retractor according to a first embodiment of the present invention.
Figure 2:
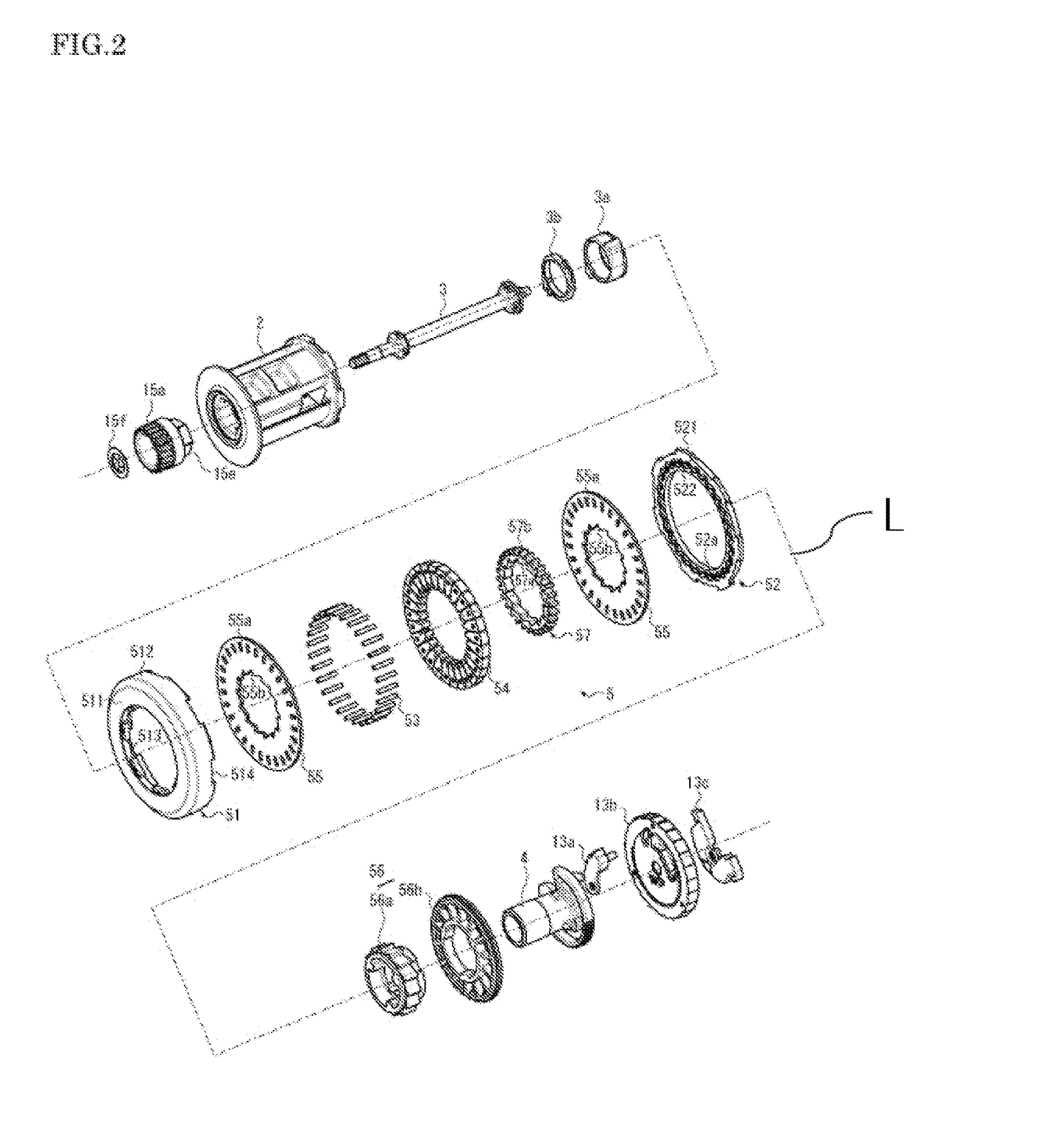
FIG. 2 is a developed view of parts, showing a shaft unit of the seat belt retractor shown in FIG. 1.
Figure 3A:
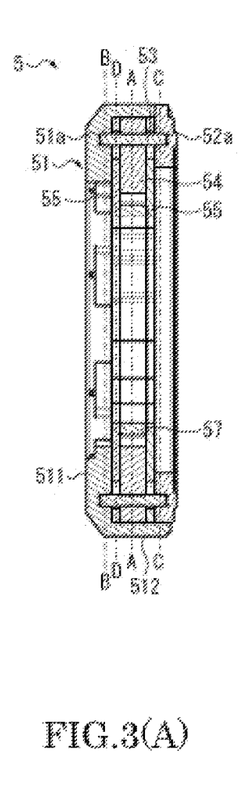
FIG. 3(A) illustrates a cross-sectional view including a rotational axis.
Figure 3B:
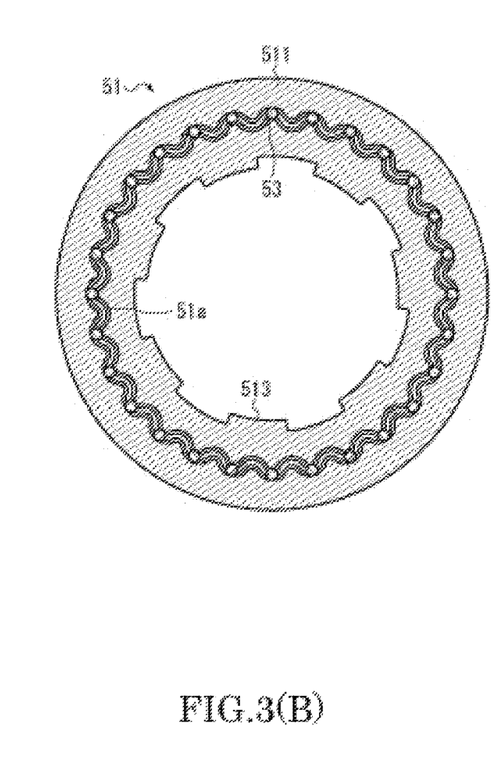
FIG. 3(B) illustrates a B-B cross-sectional view of FIG. 3(A)
Figure 3C:
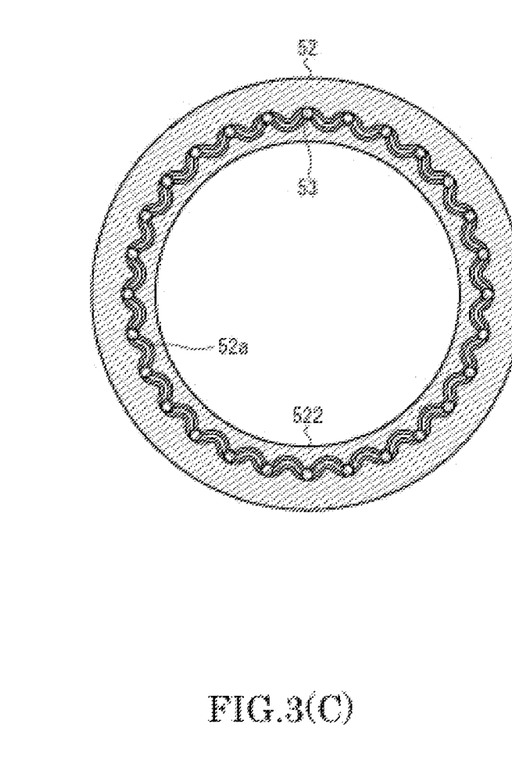
FIG. 3(C) illustrates a C-C cross-sectional view of FIG. 3(A).
Figure 4A:
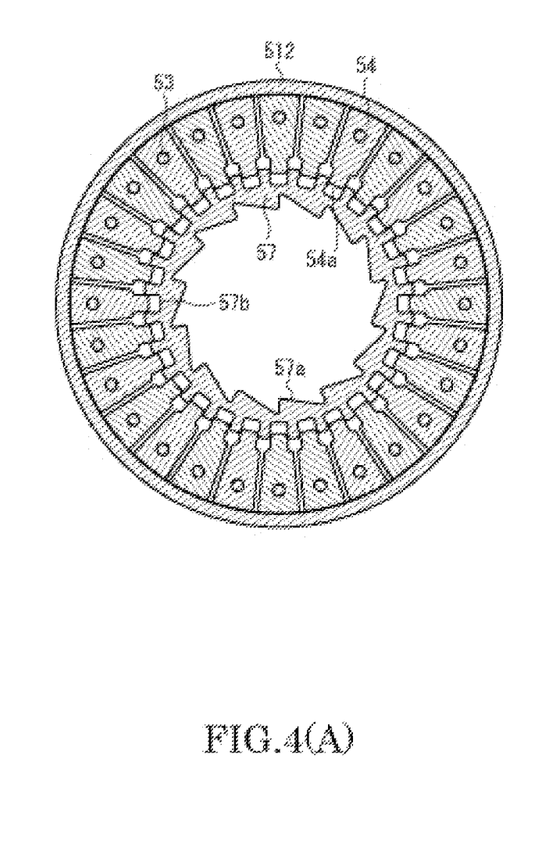
FIG. 4(A) illustrates an A-A cross-sectional view of FIG. 3(A)
Figure 4B:
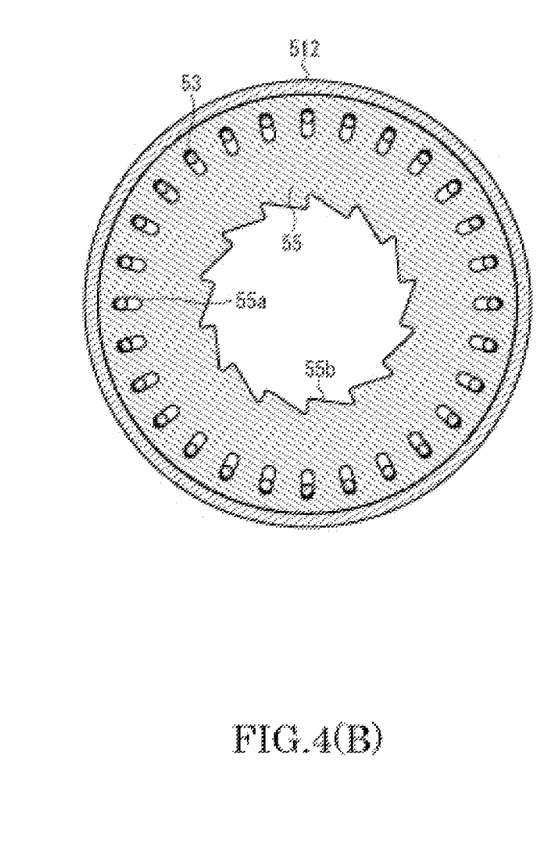
FIG. 4(B) illustrates a D-D cross-sectional view of FIG. 3(A).

Embodiments of the present invention are now described below with reference to FIGS. 1 to 9. Here, FIG. 1 is a cross-sectional view showing a seat belt retractor according to a first embodiment of the present invention. FIG. 2 is a developed view of parts, showing a shaft unit of the seat belt retractor shown in FIG. 1. FIGS. 3(A) to 3(C) are views illustrating the energy absorbing device shown in FIG. 1, in which FIG. 3(A) illustrates a cross-sectional view including a rotational axis, FIG. 3(B) illustrates a B-B cross-sectional view of FIG. 3(A), and FIG. 3(C) illustrates a C-C cross-sectional view of FIG. 3(A). FIGS. 4(A) and 4(B) are views illustrating the energy absorbing device shown in FIG. 1, in which FIG. 4(A) illustrates an A-A cross-sectional view of FIG. 3(A), and FIG. 4(B) illustrates a D-D cross-sectional view of FIG. 3(A).

A seat belt retractor 1 according to the first embodiment of the present invention includes, for example, as shown in FIGS. 1 and 2, a spool 2 that winds a webbing W that restrains an occupant, a shaft 3 that is inserted into a shaft center of the spool 2, a locking base 4 that is connected to the shaft 3 and capable of switching between a rotating state and a non-rotating state, and an energy absorbing device 5 disposed between the spool 2 and the locking base 4. It should be noted that, for convenience of description, an illustration of the webbing W is omitted in FIG. 1.

As with conventional seat belt retractors, the illustrated seat belt retractor 1 has a base frame 11 that accommodates a spool 2 rotatably and has a rectangular U-shaped cross section, a spring unit 12 disposed at a first end of a shaft 3, a lock mechanism 13 disposed at a second end of the shaft 3, an acceleration sensor 14 that detects a vehicle acceleration, and a pretensioner 15 that rotates the spool 2 to wind a webbing W to eliminate a gap between an occupant and the webbing W at a time of a vehicle collision or the like. It should be noted that the pretensioner 15 may be omitted if appropriate. The shaft 3 is configured, for example, by a torsion bar.

The spring unit 12 has, as shown in FIG. 1, a spring core 12a that forms a shaft center of a spiral spring (not shown), and a spring cover 12b that accommodates the spiral spring. The spring core 12a is connected with the first end of the shaft 3.

The lock mechanism 13 has, as shown in FIGS. 1 and 2, a locking base 4 disposed at an end of a shaft 3, a pawl 13a swingably disposed to the locking base 4, a lock gear 13b disposed at the end of the shaft 3 so as to be adjacent to an outside of the locking base 4, a flywheel 13c swingably disposed to the lock gear 13b, and a retainer 13d that accommodates these parts and rotatably supports the shaft 3.

The acceleration sensor 14 is, as shown in FIG. 1, disposed adjacent to the lock mechanism 13, and has an actuator 14a that engages with teeth formed on an outer circumference of the lock gear 13b when acceleration generated in a vehicle due to a vehicle collision or the like is detected.

When the acceleration sensor 14 detects an acceleration generated in a vehicle due to a vehicle collision or the like, the actuator 14a regulates rotation of the lock gear 13b. When the webbing W is rapidly withdrawn, the flywheel 13c swings with an inertial force to engage with teeth formed in an inner circumferential surface of the retainer 13d, and rotation of the lock gear 13b is regulated. When the rotation of the lock gear 13b is regulated, the pawl 13a swings and projects in an outer diameter direction of the locking base 4, to engage with teeth formed in an opening of the base frame 11. Due to this engagement of the pawl 13a, the locking base 4 is brought into a state of being fixed (locked) to the base frame 11.

Even when subjected to a load in a direction of withdrawing the webbing W in an operating state of the lock mechanism 13, a non-rotating state of the spool 2 can be maintained until a load equal to or more than a threshold value occurs in the shaft 3 (torsion bar), since the spool 2 is connected to the locking base 4 via the shaft 3 (torsion bar). Then, when the load equal to or more than the threshold value occurs in the shaft 3 (torsion bar), the shaft 3 (torsion bar) twists, so that the spool 2 generates relative rotational movement with respect to the locking base 4, to withdraw the webbing W.

The shaft 3 may have a stopper 3a that defines a maximum number of twisting rotation of the torsion bar. The stopper 3a is, for example, inserted with and fitted to an outer circumference of a shaft portion of the locking base 4. Such a stopper 3a regulates a withdrawn amount of the webbing W. Additionally, a collar 3b may be disposed between the stopper 3a and the spool 2 for preventing backlash.

The pretensioner 15 has, for example, as shown in FIG. 1, a pinion 15a through which the shaft 3 is inserted and coaxially arranged, a ring gear 15b that has internal teeth engageable with the pinion 15a, a power generating unit that applies power to the ring gear 15b, and a cover 15c that covers an outer circumference of the ring gear 15b. The power generating unit has, for example, a mass body (not shown) that is engaged with the outer circumference of the ring gear 15b to rotate, a pipe 15d that releasably accommodates the mass body, and a gas generator (not shown) that applies power to the mass body.

The pinion 15a and the ring gear 15b are separated at a normal time, and when the pipe 15d releases the mass body in a vehicle collision, the movement of the mass body causes the ring gear 15b to mesh with the pinion 15a, and rotation of the ring gear 15b rotates the pinion 15a to rotate the spool 2.

As shown in FIG. 2, the pinion 15a has a bearing part 15e that is extended inward and fitted to the shaft 3, and the bearing part 15e is fitted in an opening formed in the spool 2. Therefore, the first end of the shaft 3 is connected to the spool 2 via the bearing part 15e of the pinion 15a. Additionally, the pinion 15a is axially positioned by a push nut 15f.

The configuration of the seat belt retractor 1 described above is substantially same as that of, for example, a conventional seat belt retractor described in Japanese Unexamined Patent Application Laid-open No. 2012-30636 or the like, thus, further detailed description is omitted. In the seat belt retractor 1 according to the embodiment, as shown in FIGS. 1 and 2, an energy absorbing device 5 is disposed between the spool 2 and the locking base 4.

The energy absorbing device 5 is, for example, as shown in FIGS. 1 to FIG. 4(B), an energy absorbing device arranged between objects that perform relative rotational movement, and has a base plate 51 that is connected to a first object (e.g., a spool 2) and has a corrugated groove 51a annularly formed, a cover plate 52 that is opposingly connected to the base plate 51 and has a corrugated groove 52a synchronized with the corrugated groove 51a of the base plate 51, a plurality of driving pins 53 with a first end inserted into the corrugated groove 51a of the base plate 51 and a second end inserted into the corrugated groove 52a of the cover plate 52, a plurality of mass bodies 54 that are arranged in respective intermediate portions of the driving pins 53, and intermediate plates 55 through which the driving pins 53 are inserted, arranged on both sides of the mass bodies 54, and connected to a second object (e.g., a locking base 4).

In such an energy absorbing device 5, as shown in FIG. 1, the base plate 51 is fixed to the spool 2, and intermediate plates 55 are fixed to the locking base 4 via a fixing ring 56. The fixing ring 56 is, as shown in FIG. 2, configured by a shaft portion 56a that has external teeth engageable with the intermediate plates 55, and a flange part 56b that is fitted to the shaft portion 56a, and the locking base 4 is inserted into and fixed to an opening formed in a center of these. It should be noted that, while the fixing ring 56 is divided into the shaft portion 56a and the flange part 56b for a manufacture reason, the shaft portion 56a and the flange part 56b may be integrally formed.

The base plate 51 forms, for example, as shown in FIG. 3(A), a casing accommodating driving pins 53, the mass bodies 54, and the intermediate plates 55. Specifically, the base plate 51 has an annular bottom surface part 511 and a wall surface part 512 that surrounds an outer circumference thereof, and as shown in FIG. 3(B), the corrugated groove 51a is formed on an inner surface of the bottom surface part 511 (on the side formed with the wall surface part 512). The corrugated groove 51a is a groove formed meandering in a circumferential direction.

An inner edge of the bottom surface part 511 is, as shown in FIG. 3(B), formed with an engagement portion 513 having projections and depressions that can be fitted to the spool 2. An end of the wall surface part 512 is, as shown in FIG. 2, formed with an engagement portion 514 having projections and depressions that can be fitted with the cover plate 52. The cover plate 52 is formed with an engagement portion 521 having projections and depressions that can be fitted to this engagement portion 514.

In other words, the cover plate 52 forms a lid that covers an opening of the base plate 51.

The cover plate 52 has an annular flat-plate shape, and as shown in FIG. 3(C), the corrugated groove 52a is formed on an inner surface of the cover plate 52 (on the side fitted to the base plate 51). At a center part of the cover plate 52, there is formed an opening 522, and the locking base 4 is inserted to the opening 522. The corrugated groove 51a of the base plate 51 and the corrugated groove 52a of the cover plate 52 have an identical shape, are arranged facing each other with the cover plate 52 fitted to the base plate 51, and are configured to synchronize peaks and valleys. It should be noted that "synchronize" means that the corrugated groove 51a and the corrugated groove 52a have a same amplitude in a same phase, in this embodiment.

As shown in FIG. 3(A), a first end of the driving pins 53 is inserted into the corrugated groove 51a of the base plate 51, and a second end of the driving pins 53 is inserted into the corrugated groove 52a of the cover plate 52. The driving pins 53 may be made of metal, or may be made of resin. Although 28 pieces of the driving pins 53 are used in this embodiment, the driving pins 53 are not limited to the illustrated configuration, and conditions of a number, a material, weight, size, or the like may be optionally designed according to a required energy absorption amount.

The mass bodies 54 are, as shown in FIG. 3(A), each arranged in intermediate portions of the driving pins 53. The mass bodies 54 are, for example, formed of metal such as lead or iron. Moreover, the mass bodies 54 are radially arranged as shown in FIG. 4(A), since the driving pins 53 move along the corrugated groove 51a and the corrugated groove 52a causing reciprocation of the mass bodies 54 in a radial direction with respect to a rotational axis L (see FIG. 2). The mass bodies 54 are, for example, in a substantially trapezoidal shape as a whole that is formed narrower on an inner side and wider on an outer side, and have projecting parts 54a projecting inward.

Additionally, radially inward of the mass bodies 54, there may be arranged a guide ring 57 that serves as a guide to guide the reciprocation of the mass bodies 54. The guide ring 57 is an annular part having internal teeth 57a that are engaged with the shaft portion 56a of the fixing ring 56, and having guide grooves 57b that can be inserted with the projecting parts 54a of the mass bodies 54. The guide grooves 57b are, as illustrated, projection-depression portions formed along an outer edge of the guide ring 57. Inserting the projecting parts 54a of the mass bodies 54 into these guide grooves 57b enables guiding of the radial reciprocation of the mass bodies 54, and can prevent generation of an abnormal noise or damage due to a collision, caused by the swing of the mass bodies 54.

In this embodiment, as shown in FIG. 2, the driving pins 53 and the mass bodies 54 are separately configured, and the driving pins 53 are inserted into through holes formed to the mass bodies 54. Here, the driving pins 53 may be pressed into the through holes of the mass bodies 54, or may be inserted into the through holes of the mass bodies 54 in a loose fitting manner. Although not illustrated, the driving pins 53 and the mass bodies 54 may be integrally formed by die-casting or the like.

When the driving pins 53 are pressed into the mass bodies 54 or when the driving pins 53 and the mass bodies 54 are integrally formed, the driving pins 53 can be fixed to the mass bodies 54, which can prevent rotation (self-rotation) of the driving pins 53 moving in the corrugated groove 51a and the corrugated groove 52a. Therefore, in addition to an inertial force generated by weight of the driving pins 53 and the mass bodies 54, a friction force can be generated by the driving pins 53 sliding in the corrugated groove 51a and the corrugated groove 52a, and such a friction force can also increase the energy absorption amount.

On the other hand, when the driving pins 53 are inserted into the mass bodies 54 in a loose fitting manner, the driving pins 53 are not fixed to the mass bodies 54, so that the driving pins 53 are allowed to rotate when moving in the corrugated groove 51a and the corrugated groove 52a. Therefore, it is possible to prevent a generation of a friction force of the driving pins 53 moving in the corrugated groove 51a and the corrugated groove 52a, and to absorb energy by only an inertial force generated by the weight of the driving pins 53 and the mass bodies 54. Since a value of a friction force is unstable, extracting only the inertial force in this way can make it easy to control the energy absorption amount.

The intermediate plates 55 are, as shown in FIG. 3(A), arranged between the base plate 51 and the mass bodies 54, and between the cover plate 52 and the mass bodies 54. Such arrangement of the two intermediate plates 55 enables an application of a balanced load to the driving pins 53, and reduction of occurrence of stress concentration. The intermediate plates 55 are annular parts having a plurality of long holes 55a through which the driving pins 53 are inserted, and having internal teeth 55b that are engaged with the shaft portion 56a of the fixing ring 56. A longer diameter of the long holes 55a is arranged along a radial direction, and its length is designed so as to be larger than the amplitude of the corrugated groove 51a and the corrugated groove 52a.

Figure 5A:
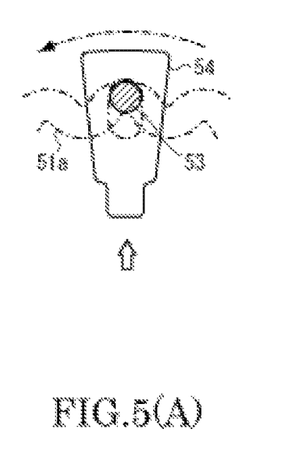
FIG. 5(A) is a state where a driving pin is in a top part of a corrugated groove.
Figure 5B:
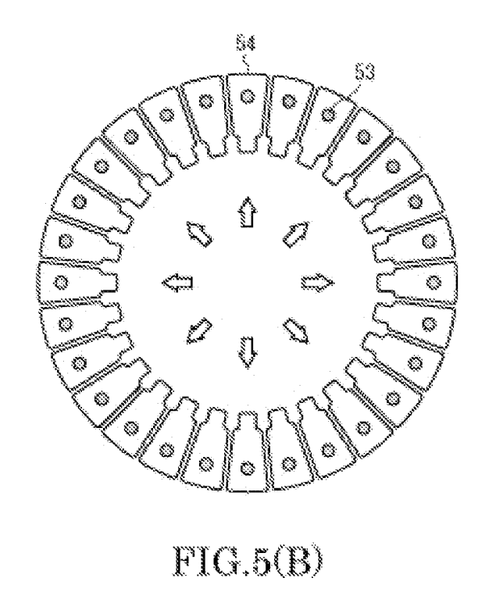
FIG. 5(B) is a view illustrating a position of mass bodies in the state of FIG. 5(A)
Figure 5C:
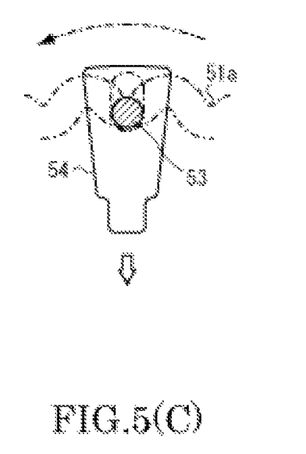
FIG. 5(C) is a state where a driving pin is in a bottom part of the corrugated groove.
Figure 5D:
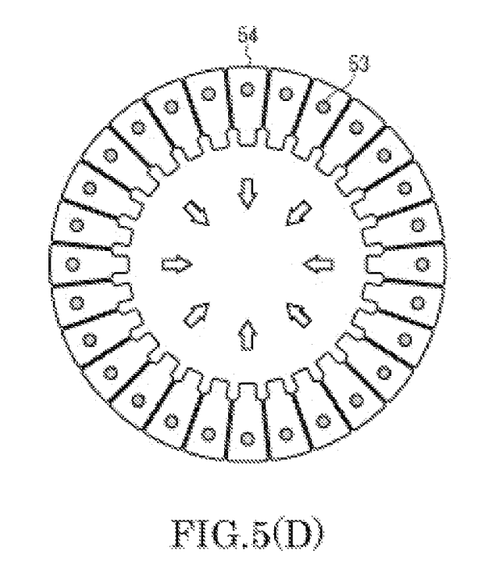
FIG. 5(D) is a view illustrating a position of the mass bodies in the state of FIG. 5(C).

Here, an operation of the above-described energy absorbing device 5 is described with reference to FIGS. 5(A) and 5(B). FIGS. 5(A) to 5(D) are views illustrating an operation of the energy absorbing device, in which FIG. 5(A) is a state where a driving pin is at a top part of the corrugated groove, FIG. 5(B) is a view illustrating a position of the mass bodies in the state of FIG. 5(A), FIG. 5(C) is a state where a driving pin is at a bottom part of the corrugated groove, and FIG. 5(D) is a view illustrating a position of the mass bodies in the state of FIG. 5(C). It should be noted that, in FIGS. 5(A) and 5(C), the corrugated groove 51a and a long hole 55a are indicated by dotted-chain lines for convenience of description.

Here, it is assumed that the lock mechanism 13 is operated to fix the locking base 4 to the base frame 11. In this case, since the spool 2 is connected to the locking base 4 via the shaft 3, a non-rotating state of the spool 2 is maintained. For example, when an occupant moves forward to apply a load in a withdrawal direction of the webbing W, the non-rotating state of the spool 2 is maintained until a load equal to or more than a predetermined threshold value occurs in the shaft 3, since the shaft 3 is configured by a torsion bar in this embodiment.

Then, when the load equal to or more than the predetermined threshold value occurs in the shaft 3, the shaft 3 twists, so that the spool 2 generates relative rotational movement with respect to the locking base 4, to withdraw the webbing W. The relative rotational movement of the spool 2 causes relative rotational movement between the base plate 51 and the intermediate plates 55, and between the cover plate 52 and the intermediate plates 55 of the energy absorbing device 5, to cause movement of the driving pins 53 along the corrugated groove 51a and the corrugated groove 52a.

As shown in FIG. 5(A), when the driving pins 53 pass the top part of the corrugated groove 51a, the driving pins 53 are in a state being moved to radially outermost position, and as shown in FIG. 5(B), the mass bodies 54 are also in a state being moved to radially outermost position. On the other hand, as shown in FIG. 5(C), when the driving pins 53 pass a bottom part of the corrugated groove 51a, the driving pins 53 are in a state being moved to radially innermost position, and as shown in FIG. 5(D), the mass bodies 54 are also in a state being moved to radially innermost position. Namely, the mass bodies 54 rotate (revolve) in interlocking with driving pins 53, while radially reciprocating between the states shown in FIG. 5(B) and FIG. 5(D).

Along with the movement of the driving pins 53, the relative rotational movement occurs between the base plate 51 and the intermediate plates 55, and between the cover plate 52 and the intermediate plates 55. At this time, an inertial force generated by the driving pins 53 and the mass bodies 54 absorbs energy applied from the spool 2. An inertial force is, in general, represented by a formula F=m·a (where m represents a mass, and a represents acceleration), in which a magnitude of the inertial force F can be adjusted by a magnitude of the mass m if the acceleration a is same. Thus, the mass of the driving pins 53 and the mass bodies 54 are optionally designed according to a measurement value of an acceleration a generated in the webbing W.

Further, an acceleration generated in an occupant at a time of a vehicle collision or the like, namely, the acceleration a generated in the webbing W tends to be increased over time, and an absorption amount of energy applied from the spool 2 can be varied by a magnitude of the acceleration a if the mass m is same. Furthermore, while the acceleration a generated in the webbing W varies depending on a difference in physique (weight difference) of the occupant, again the energy absorption amount of the energy absorbing device 5 can be varied according to the magnitude of the acceleration a.

According to the energy absorbing device 5 of the embodiment described above, by causing a relative rotational movement between the base plate 51 and the cover plate 52, and the intermediate plates 55 around a common rotational axis, the driving pins 53 with mass bodies 54 can be moved along the corrugated groove 51a and the corrugated groove 52a, and an inertial force can act on the driving pins 53. Moreover, increase/decrease of an acceleration of the relative rotational movement increases and decreases an acceleration of the driving pins 53, which accordingly increases and decreases the inertial force. Therefore, between objects that perform relative rotational movement, the energy absorption amount can be varied according to the increase/decrease of the acceleration of the rotational movement, and the energy absorption characteristic can be changed continuously.

According to the energy absorbing device 5 of the embodiment, energy generated between objects that perform relative rotational movement is converted to an inertial force, which is generated by movement of the driving pins 53 having the mass bodies 54, to be absorbed, which eliminates an object moving in an axial direction, easily enhances a structural strength, and can improve durability of the energy absorbing device 5.

Additionally, according to the seat belt retractor 1 of the embodiment described above, the spool 2 and the locking base 4 can be maintained so as not to be relatively rotated by the torsion bar (shaft 3), until a load equal to or more than a predetermined threshold value is applied to the shaft 3. Thus, even in an initial stage of a vehicle collision, the torsion bar (shaft 3) can prevent the operation of the energy absorbing device 5, an occupant can be restrained in a seat, and restraint performance of the seat belt retractor 1 can be improved.

Figure 6A:
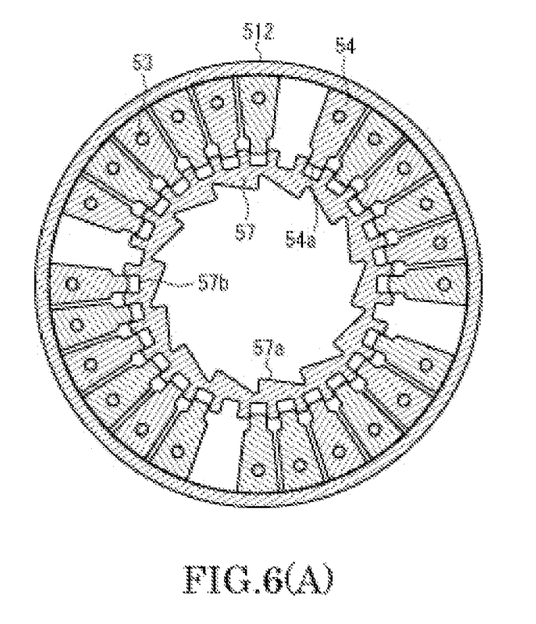
FIG. 6(A) illustrates a first modification.
Figure 6B:
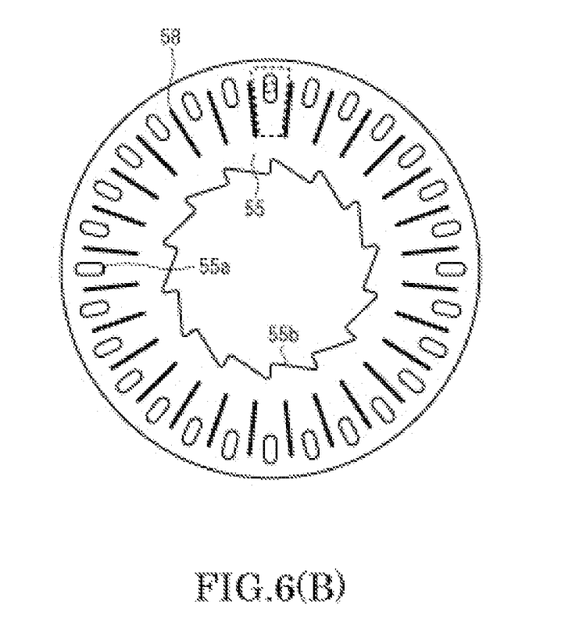
FIG. 6(B) illustrates a second modification.

Next, modifications of the above-described energy absorbing device 5 are described with reference to FIGS. 6(A) and (B). Here, FIGS. 6(A) and 6(B) are views illustrating the modifications of the energy absorbing device shown in FIG. 1, in which FIG. 6(A) illustrates a first modification, and FIG. 6(B) illustrates a second modification. It should be noted that FIG. 6(A) is equivalent to the A-A cross-sectional view of FIG. 3(A), and FIG. 6(B) shows a plan view of each of the intermediate plates 55.

The first modification shown in FIG. 6(A) is made by reducing a number of the driving pins 53 and the mass bodies 54 in the first embodiment described above. As described above, while the energy absorption amount of the energy absorbing device 5 depends on the mass m of the driving pins 53 and the mass bodies 54, the mass m can be changed by reducing the number of the driving pins 53 and the mass bodies 54, as illustrated.

According to such a first modification, while mass-producing the energy absorbing device 5 as a standard product, it is possible to change the mass m according to a device to which the energy absorbing device 5 is disposed, and to set a mass m optimal for a device that is mounted with the energy absorbing device 5. It should be noted that, the driving pins 53 and the mass bodies 54 are reduced at every six pieces in FIG. 6(A), the reduction method is not limited to that illustrated.

The second modification shown in FIG. 6(B) is made by forming, on the intermediate plates 55, a guide projection 58 that serves as a guide to guide a movement of the mass bodies 54. When such a guide projection 58 is formed, the guide ring 57 can be omitted. Additionally, since the guide projection 58 guides a side surface of the mass bodies 54, it is possible to omit the projecting parts 54a of the mass bodies 54 illustrated in the first embodiment described above. It should be noted that, for convenience of description, a driving pin 53 and a mass body 54 are illustrated by dashed lines in FIG. 6(B).

Next, a layout of the seat belt retractor 1 according to the first embodiment described above is described with reference to FIGS. 7(A) and 7(B). Here, FIGS. 7(A) and 7(B) are conceptual views showing the seat belt retractor shown in FIG. 1, in which FIG. 7(A) illustrates the first embodiment, and FIG. 7(B) illustrates a modification.

Figure 7A:
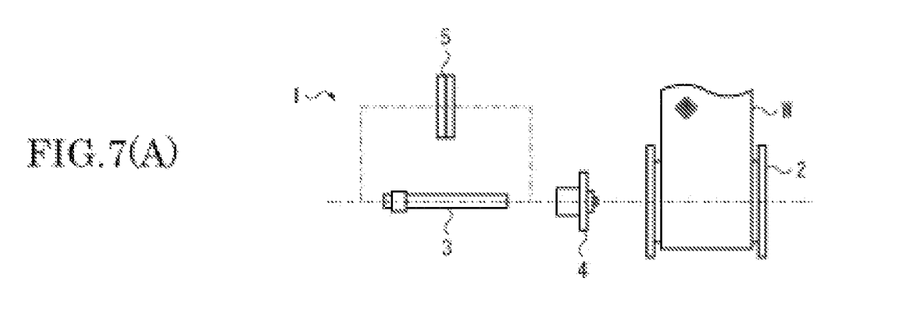
FIG. 7(A) illustrates the first embodiment.

As shown in FIG. 7(A), in the seat belt retractor 1 according to the first embodiment, the shaft 3 as a torsion bar and the energy absorbing device 5 are arranged conceptually in parallel. Here, "in parallel" means that a power transmission passage is in parallel, and the energy absorbing device 5 is, as shown in FIGS. 1 and 2, actually arranged concentrically with the spool 2, the shaft 3, and the locking base 4. It should be noted that the torsion bar is a kind of a load-adjusting member 6 described below.

Figure 7B:
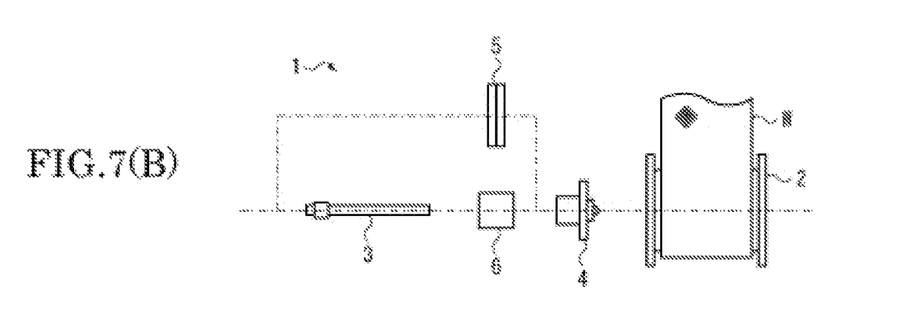
FIG. 7(B) illustrates a modification.

Additionally, as shown in FIG. 7(B), the shaft 3 is not required to be configured by a torsion bar, and a function can be divided to the shaft 3 and the load-adjusting member 6. The load-adjusting member 6 is a part that cuts or loosens a connection between two objects, and blocks or reduces a load transmission, when a load equal to or more than a predetermined threshold value is generated between the two objects to cause overload. The load-adjusting member 6 is, for example, a load limiter or a torque limiter. As the load limiter or the torque limiter, various types of those commercially available can be optionally selected and used.

Figure 8A:
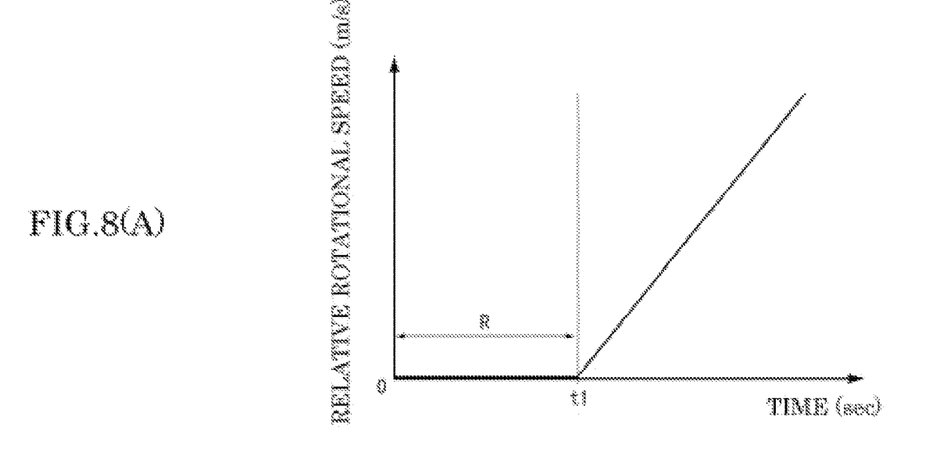
FIG. 8(A) shows a relative rotational speed over time.
Figure 8B:
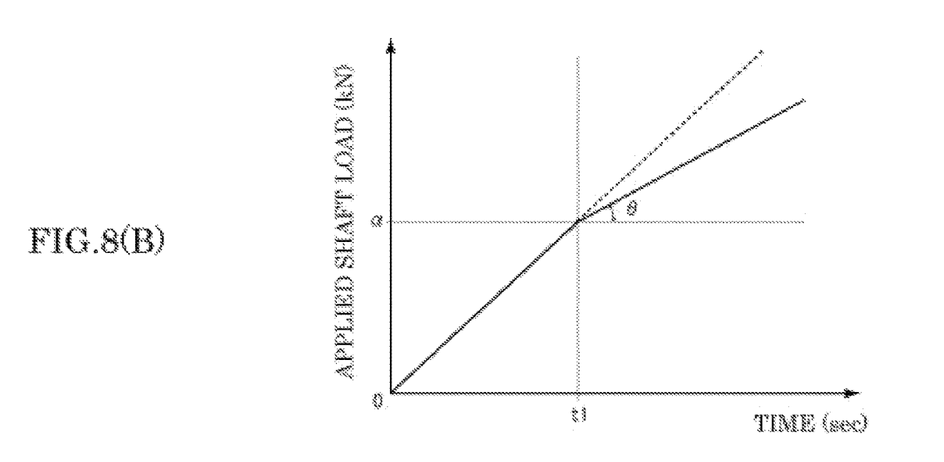
FIG. 8(B) shows an applied shaft load over time.

Here, an effect of the seat belt retractor 1 having the configuration described above is described with reference to FIGS. 8(A) and 8(B). Here, FIGS. 8(A) and 8(B) are graphs showing an effect of the seat belt retractor according to the first embodiment of the present invention, in which FIG. 8(A) shows a relative rotational speed over time, and FIG. 8(B) shows an applied shaft load over time. Specifically, FIG. 8(A) shows a change in a speed of relative rotation generated between the spool 2 and the locking base 4, in which the horizontal axis indicates time (sec), and the vertical axis indicates relative rotational speed (m/s). FIG. 8(B) shows a change in the applied shaft load, in which the horizontal axis indicates time (sec), and the vertical axis indicates the applied shaft load (kN).

It is assumed that the locking base 4 is locked, and the shaft 3 is in a non-rotating state, at the time t=0. When the webbing W is withdrawn in this state, a torque (load) is transmitted from the spool 2 to the shaft 3, which gradually increases the applied shaft load, as shown in FIG. 8(B). When this applied shaft load is less than a threshold value α, the load-adjusting member 6 (torsion bar) is not in operation, so that the relative rotational speed between the spool 2 and the locking base 4 remains zero as shown in FIG. 2(A). Namely, in a range of the time t=0 to t1, since the shaft 3 is in the non-rotating state, withdrawal of the webbing W (rotation of the spool 2) is prevented, forming an initial locked region R.

Then, when the applied shaft load reaches the threshold value α at the time t=t1, the load-adjusting member 6 (torsion bar) is operated to cause relative rotational movement between the spool 2 and the locking base 4, gradually increasing the relative rotational speed as shown in FIG. 8(A). This relative rotational movement operates the energy absorbing device 5, and energy of the applied shaft load is absorbed according to the magnitude of the relative rotational speed, as shown in FIG. 8(B). In other words, the energy absorption amount of the energy absorbing device 5 is small when the relative rotational speed is low, and the energy absorption amount of the energy absorbing device 5 become larger as the relative rotational speed become higher.

Further, a gradient of the relative rotational speed shown in FIG. 8(A) varies depending on weight or physique of an occupant, for example, the gradient of the relative rotational speed is small when the occupant is light, and the gradient of the relative rotational speed is large when the occupant is heavy. Then, according to the energy absorbing device 5 of the embodiment, the energy absorption amount is automatically varied according to the gradient of the relative rotational speed. Namely, an inclination angle e of the applied shaft load shown in FIG. 8(B) is automatically adjusted.

According to the embodiment described above, the spool 2 and the locking base 4 can be maintained so as not to be relatively rotated by the load-adjusting member 6 (torsion bar), until a load equal to or more than a threshold value α is applied to the shaft 3. Thus, even in an initial stage of a vehicle collision, the load-adjusting member 6 (torsion bar) can prevent the operation of the energy absorbing device 5, an occupant can be restrained in a seat, and restraint performance of the seat belt retractor 1 can be improved.

Additionally, when a load equal to or more than the threshold value α is applied to the shaft 3, the load-adjusting member 6 (torsion bar) is operated to cause relative rotational movement between the spool 2 and the locking base 4, causing operation of the energy absorbing device 5. In this case, by using the energy absorbing device 5 capable of varying the energy absorption amount according to the relative rotational speed, the energy absorption characteristic can be continuously varied, energy can be properly absorbed according to difference in physique or the like of an occupant, and the energy absorption characteristic of the seat belt retractor 1 can be improved.

Although not illustrated, the energy absorbing device 5 may be arranged conceptually in series with respect to the load-adjusting member 6. Here, "in series" means that a power transmission passage is in series, and the energy absorbing device 5 is, actually arranged concentrically with the spool 2, the shaft 3, and the locking base 4.

Next, a seat belt device 101 that includes the above-described seat belt retractor 1 is described with reference to FIG. 9. Here, FIG. 9 is a view illustrating an overall structure of the seat belt device according to the embodiment.

Figure 9:
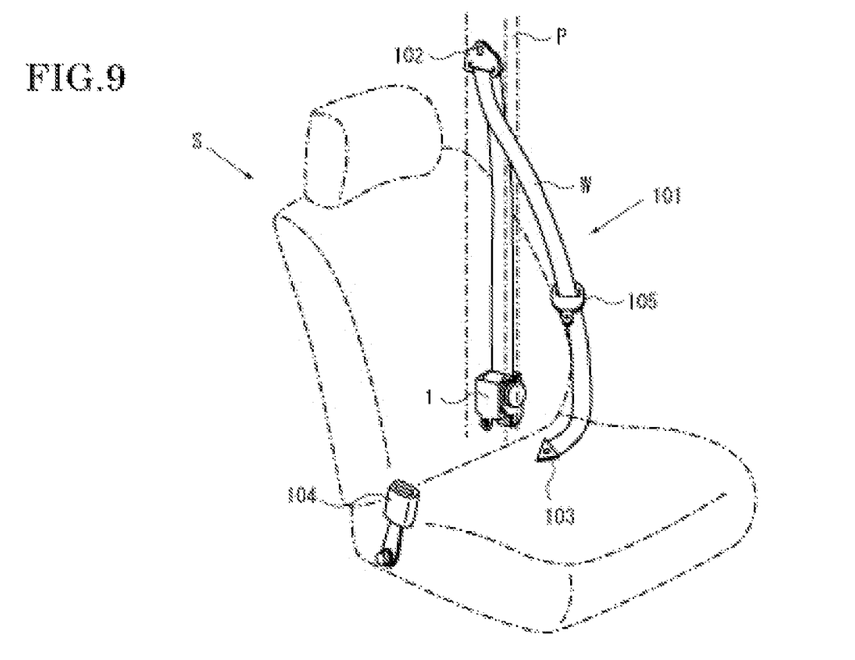
FIG. 9 is a view illustrating an overall structure of a seat belt device according to the embodiment.

The seat belt device 101 illustrated in FIG. 9 includes a webbing W that restrains an occupant (not shown) in a seat S, a seat belt retractor 1 that winds the webbing W, a guide anchor 102 that is provided on a vehicle body side and guides the webbing W, a belt anchor 103 that fixes the webbing W to the vehicle body side, a buckle 104 disposed on a side surface of the seat S, and a tongue 105 disposed to the webbing W. The seat belt retractor 1 is any of seat belt retractors 1 according to the first embodiment (including modifications) described above.

The illustrated seat belt device 101 is a seat belt device, so-called for a passenger seat, in which a pillar P is often arranged at a position adjacent to the seat S. Additionally, for example, the seat belt retractor 1 is disposed in the pillar P, and the guide anchor 102 is disposed on a surface of the pillar P. In such a seat belt device 101, by withdrawing the webbing W and fitting the tongue 105 into the buckle 104, an occupant can be restrained in the seat S with the webbing W.

It should be noted that, since configurations of the seat belt device 101 other than the seat belt retractor 1 are similar to those of conventional seat belt devices, detailed description is omitted here. Additionally, the seat belt device 101 is not limited for use in a passenger seat, but it may be a seat belt device for a driver's seat, or may be a seat belt device for a rear seat. For a seat belt device for a rear seat, the guide anchor 102 may be omitted.

The present invention is not limited to the above-described embodiment, but of course, various modifications can be made without departing from the spirit of the invention. For example, the above-described energy absorbing device 5 may be disposed to a device that performs relative rotational movement, other than a seat belt retractor 1.

The invention claimed is:

1. An energy absorbing device disposed between objects that perform relative rotational movement, the energy absorbing device comprising:
   a base plate that is connected to a first object and has a corrugated groove annularly formed;
   a cover plate that is opposingly connected to the base plate and has a corrugated groove synchronized with the corrugated groove of the base plate;
   a plurality of driving pins with a first end inserted into the corrugated groove of the base plate and a second end inserted into the corrugated groove of the cover plate;
   a plurality of mass bodies that are arranged in respective intermediate portions of the driving pins; and
   intermediate plates that are inserted with the driving pins, arranged on both sides of the mass bodies, and connected to a second object.

2. The energy absorbing device according to claim 1, wherein the mass bodies are formed capable of reciprocating in a radial direction with respect to a rotational axis.

3. The energy absorbing device according to claim 2, comprising a guide that guides movement of the mass bodies.

4. The energy absorbing device according to claim 1, wherein the driving pins are integrally formed with the mass bodies, pressed into the mass bodies, or inserted into the mass bodies in a loose fitting manner.

5. A seat belt retractor comprising a spool that winds a webbing that restrains an occupant; a shaft that is inserted into a shaft center of the spool; and a locking base that is connected to the shaft and capable of switching between a rotating state and a non-rotating state, characterized by comprising an energy absorbing device disposed between the spool and the locking base, wherein the energy absorbing device is an energy absorbing device according to claim 1.

6. A seat belt device comprising: a webbing that restrains an occupant in a seat; a seat belt retractor that winds the webbing; a belt anchor that fixes the webbing to a vehicle body side; a buckle disposed on a side surface of the seat; and a tongue disposed to the webbing, wherein the seat belt retractor has an energy absorbing device according to claim 1.

* * * * *